United States Patent [19]

Houseman et al.

[11] 3,900,831
[45] Aug. 19, 1975

[54] OPERATION LAMP AND STEER INDICATOR

[75] Inventors: Henry J. Houseman, Fairless Hills; Gerald W. Skulley, Doylestown, both of Pa.

[73] Assignee: Eaton Corporation, Cleveland, Ohio

[22] Filed: July 12, 1973

[21] Appl. No.: 378,753

[52] U.S. Cl.............. 340/52 R; 116/31; 180/104; 340/249
[51] Int. Cl.² .......................................... B60Q 1/00
[58] Field of Search........ 340/52 R, 52 D, 52 H, 87, 340/249, 266, 267 C, 271, 378 R, 248 B; 116/31; 180/103, 104; 307/10 BP

[56] References Cited
UNITED STATES PATENTS

| | | | |
|---|---|---|---|
| 1,675,656 | 7/1928 | Meredith | 116/31 |
| 2,422,157 | 6/1947 | Wolff | 340/378 R |
| 2,663,860 | 12/1953 | MacInnes et al. | 340/248 B |
| 3,031,024 | 4/1962 | Ulinski | 116/31 |
| 3,522,481 | 8/1970 | Terzic | 340/249 |

*Primary Examiner*—John W. Caldwell
*Assistant Examiner*—Joseph E. Nowicki
*Attorney, Agent, or Firm*—Teagno & Toddy

[57] ABSTRACT

A combination steering wheel position, "power on" and battery condition indicator for a material handling vehicle of the order picker type. An illuminated pointer attached directly to the drive/steer unit of the vehicle and visible through a window in the top of the vehicle power unit provides a direct indication of wheel position to an operator located in an elevated position relative to the power unit. The light source is energized through a key switch at the operator's station to provide "power on" indication, and a flasher is wired in parallel with a battery discharge indicator such that when a low battery condition exists the discharge indicator inserts the flasher in series with the light source.

8 Claims, 5 Drawing Figures

PATENTED AUG 19 1975    3,900,831
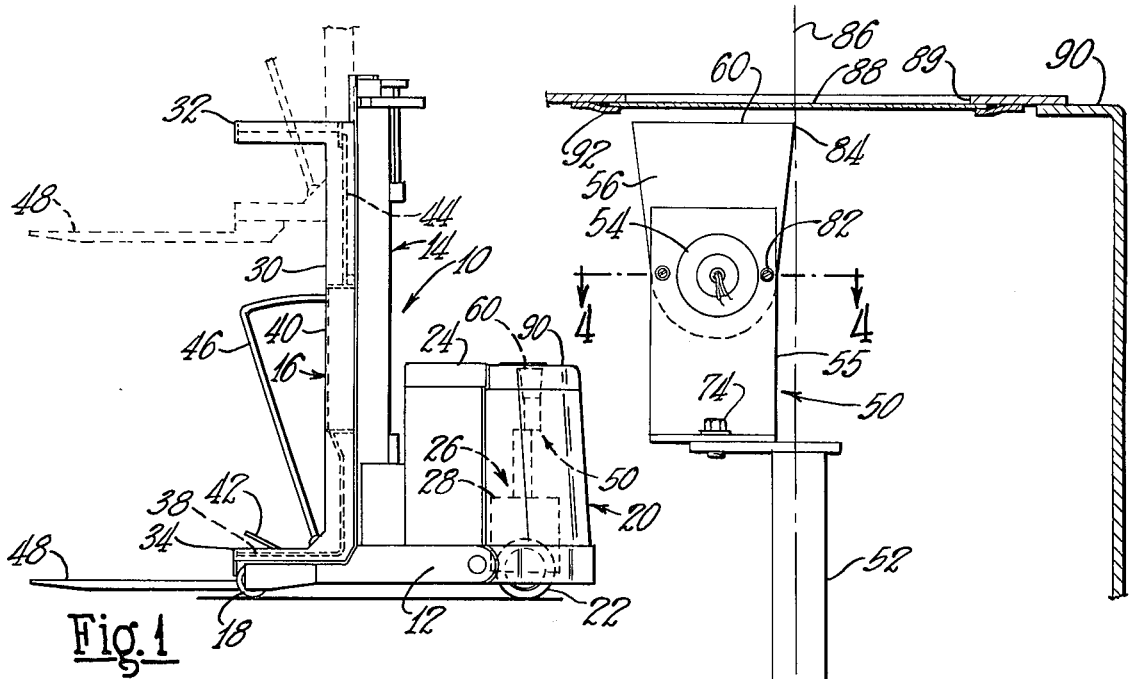
Fig.1
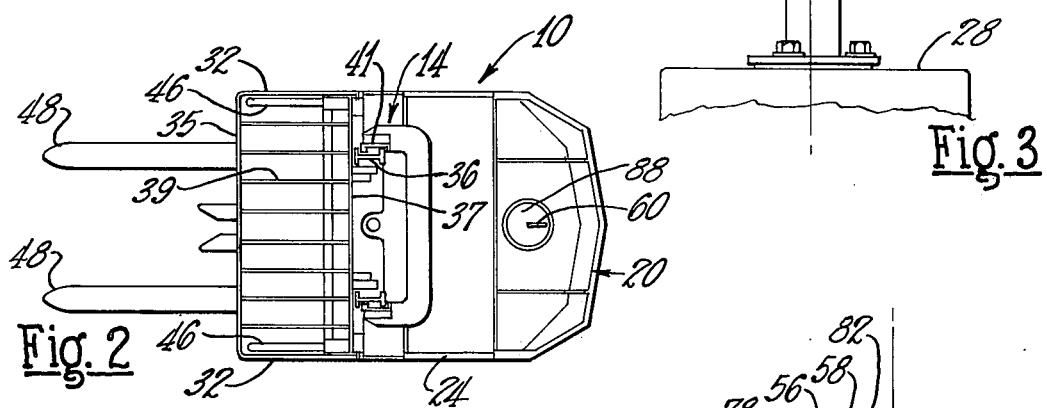
Fig.2
Fig.3
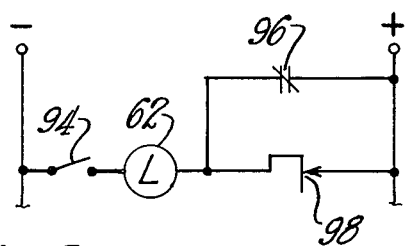
Fig.5
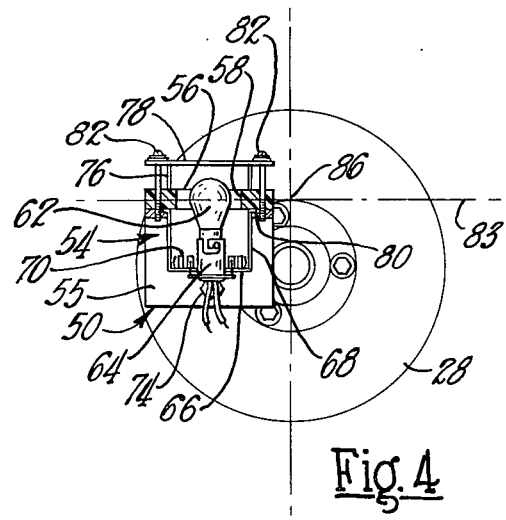
Fig.4

OPERATION LAMP AND STEER INDICATOR

This invention relates to a mechanism for providing visual indication of the operational status of various systems of a material handling vehicle, and more particularly to a combined "power-on," battery condition, and steering wheel position indicator.

Material handling vehicles which must be maneuvered in close quarters are sometimes provided with a mechanism providing visual indication to the operator of the angular position of the steerable wheel or wheels of the vehicle so that the operator knows at all times the direction in which the vehicle will move when it is started. Such indication is especially important in so-called order picking trucks where the operator is positioned on and controls the vehicle from a platform which at any given time can be located high above the power unit of the vehicle. From the standpoint of operator safety as well as efficient operation it is important that when the operator platform is located in an elevated position the operator not be subjected to any unexpected movement of the vehicle.

Another important consideration in an electric order picking vehicle is to provide the operator with a ready indication of the operational status of the vehicle with a minimum of distraction from his primary order picking function. In an electric vehicle the most important status indications are that the vehicle is in a "power on" mode and that the battery is in a sufficiently charged condition to provide uninterrupted operation for a given order picking cycle.

Wheel direction systems for industrial vehicles are known in the art. For example, U.S. Pat. No. 3,008,446, issued to George F. Quayle, discloses such a system. The prior art systems, however, do not provide the visibility and convenience necessary in an order picker vehicle in which the operator is generally remotely located from the power unit. Such remote location generally requires the use of a remote hydraulic steering system, in which case a mechanical wheel position indicator system such as that disclosed by the system of U.S. Pat. No. 3,008,446 is not feasible. What is required is an indicator system having a direct connection to the steerable wheel(s) of the vehicle and which is highly visible to an operator located on an elevated order picking platform, while at the same time being unobtrusive and not interfering with other vehicle operations.

Since an operator must check his wheel position before every vehicle start it would be most convenient for the operator to have the essential system status indications, that is "power on" and battery condition, integrated into the wheel position indicator system.

With the above considerations in mind it is an important object of the present invention to provide a steering wheel position indicating system for a material handling vehicle of the order picker type.

Another object of the invention is to provide a wheel position indicator system for a vehicle having an operator's platform remote from the power unit of the vehicle.

Another object of the invention is to provide, in accordance with all the above objects, visual indication of the status of essential vehicle systems in combination with a wheel position indicator.

Another object of the invention is to provide, in an electric vehicle, a combination steering wheel position indicator and visual "power on" and battery condition indicators.

In order to meet the above objectives the present invention provides a light source, mounted directly on the drive/steer unit, which edge lights a fluorescent plastic pointer visible through a dial face mounted in the power unit compartment cover. The combination of the location of the indicator, the direct connection to the steered wheels, and the high visibility afforded by the edge-lighted pointer provides an easily recognizable indication of wheel position even when the operator platform is at its highest elevation.

To provide "power on" indication the light source is energized through the master key switch at the operator's station. Battery condition indication is provided by wiring a flasher unit in parallel with a normally closed battery discharge indicator in the light source circuit so that when a low battery condition exists the discharge indicator inserts the flasher in series with the light source.

Other objects and advantages of the invention will be apparent from the specification when taken in connection with the accompanying drawings, wherein:

FIG. 1 is a side elevation view of a material handling vehicle incorporating the invention;

FIG. 2 is a plan view of the vehicle of FIG. 1;

FIG. 3 is an enlarged elevation view of the indicator assembly;

FIG. 4 is a partial sectional view along line 4—4 of FIG. 3; and

FIG. 5 is a partial wiring diagram showing the indicator circuit.

Referring to the drawings, the present invention is shown applied to an electric material handling vehicle of the type known as an order picker and is designated generally by the numeral 10.

The vehicle 10 comprises a main frame 12, a rigid mast 14 attached to the main frame, an operator's platform 16 mounted for vertical movement along the mast 14, a pair of load wheels 18 (one of two shown) and a power unit 20, which includes at least one drive and steer wheel 22.

As illustrated herein the power unit 20 includes a battery compartment 24 and a drive/steer assembly 26. The drive/steer assembly is of the type in which a traction motor 28 is pivotally mounted to the frame 12 for rotation about a vertical axis and drives a single or dual centrally located drive wheel 22 by means of a suitable gear box or the like. Steering rotation of the drive/steer assembly 26 is obtained by means of a hydraulic motor controlled by a valve on the operator's platform. Hydrostatic steering is well known in the art and will not be described in detail herein.

The operator's platform 16 is a rigid unitary structure including spaced side frame members 30 which include integral horizontally projecting parts or members 32 and 34 at the top and bottom respectively. The side rails 30 are connected by transverse members (not shown) which also support rail members 36 (see FIG. 2) interfitting with rail members 41 of the mast 14 in a conventional manner to mount the operator's platform 16 for vertical movement along the mast. Movement of the operator's platform relative to the mast can be provided by a hydraulic cylinder acting between the mast 14 and the platform 16, by a chain drive arrangement, or by other means well known in the industrial vehicle field. The platform is then movable from the position shown in solid line in FIG. 1 to a number of elevated positions, such as that shown in broken line, to coincide with storage bins in a warehouse aisle in which the order picker is working. By providing multiple mast sections it is common for the operator's platform to be elevated to a position wherein the operator can be over 20 feet above the floor.

The bottom horizontally projecting rails 34 serve to define an operator's station including a floor plate 38 on which the operator stands. The vehicle controls are located on a vertical panel 40 between the side rails 30 such that the vehicle is normally operated with the operator facing to the right in FIG. 1, which direction will be considered forward for purposes of this discussion. A "dead man" switch in the form of a hinged panel 42 projecting from the floor plate 38 permits the vehicle to be operated only when the operator is in a position to depress the plate. A plastic or shatterproof glass window 44 extending between the rails 30 is provided to protect the operator while still offering good forward visibility. Side rails 46 are provided to prevent an operator from falling off the platform. The top projecting rails 32, in conjunction with transverse rails 35 and 37 and longitudinal bars 39 define an overhead guard for the operator.

In an order picking operation the vehicle 10 is positioned within an aisle such that load forks 48, which are attached to the platform 16 as shown, are aligned with a vertical row of bins or the like. Generally, a pallet or other load receiving means (not shown) will be in position on the forks 48 at the start of a picking operation. The platform 16 is then elevated to put the operator in position to remove articles from a particular bin and place them on the forks 48. When picking from a given bin is completed the vehicle 10 can be maneuvered to place the operator adjacent another bin for continued picking. Since all vehicle controls are located at the operator's platform the vehicle and platform can be maneuvered simultaneously to take the most direct route to the next bin. It can be appreciated that if the platform is in an elevated position when the vehicle is to be moved it is important that the operator knows the angular orientation of the drive/steer wheel 22 in order to avoid a situation in which an unexpected motion of the vehicle could cause injury to the operator as well as damage to the load.

Referring particularly to FIG. 3, a wheel position indicator assembly 50 is provided to give the operator a clear indication of the position of the drive/steer wheel 22 from any elevation of the platform 16. The indicator assembly essentially comprises a pedestal 52 attached directly to and extending vertically from the casing of the traction motor 28, a light source assembly 54 mounted on a bracket 55 surmounting the pedestal 52, and a light conducting member 56, which can be a piece of acrylic plastic, disposed with respect to the light source assembly so that one edge 58 serves as a light receiving surface, and a second edge serves as a light emitting surface 60. The light receiving and emitting surfaces are ground to permit light transmission; whereas the remaining surfaces are polished. Accordingly, essentially all the light from source 54 is transmitted to edge 60 with little or no radiation from the other surfaces.

Referring particularly to FIG. 4, the light source assembly 54 comprises a standard automotive type lamp 62 and socket 64 attached to a plug member 66 which is received in a cylindrical housing 68 and retained therein by spring fingers 70 formed on the edge of the plug. The housing 68 is attached to the bracket 55 which is attached to the pedestal 52, by a bolt 74 or other suitable attaching means, such that the lamp 62 projects through a hole in the bracket. A somewhat smaller, coaxial hole is formed in the light conducting member 56 such that the light receiving edge 58 is formed by the inner peripheral surface of the hole. In order to provide an enclosed lamp housing a cylindrical spacer or enclosure member 76 is provided on the opposite side of the bracket 55 which is closed and retained against the bracket by means of a cover plate 78. The light conducting member 56 and an outwardly turned flange portion 80 of the housing 68 are sandwiched between the bracket 55 and the spacer 76 and retained by screws 82 running through an extended edge of the cover plate 78.

The light conducting member 56 is oriented so that the light emitting surface 60 acts as a pointer aligned with the plane of rotation of the drive/steer wheel 22 to indicate its angular position. Accordingly, the longitudinal axis of the surface 60 is disposed along the centerline 83 of the drive/steer assembly 26 with the rearward edge 84 of the surface 60 on the steering axis 86. It should be noted from FIG. 4 that the steering axis 86 does not necessarily coincide with the motor axis.

Referring particularly to FIGS. 2 and 3, a transparent dial face 88 in an opening 89 in the top surface of the power unit compartment cover 90 is provided to make the light emitting surface, or pointer, 60 visible to an operator at any elevation of the operator's platform 16. The dial face 88 can be of glass or plastic and can be attached to the cover in any convenient manner, such as by spring clips 92 bolted or otherwise fastened to the cover. It has been found that by making the light conducting member 56 of a fluorescent red plastic material and the dial face 88 of gray plastic, a wheel position indicator is provided which offers excellent visibility from all elevations of the platform 16 and under a wide range of ambient light conditions.

In order to ease vehicle control as much as possible and thereby enhance both operator safety and efficiency, the present invention integrates two additional essential vehicle indicators into the wheel position indicator.

Referring to FIG. 5, the lamp 62 in energized through a key switch 94 on the control panel 40. The key switch 94 energizes all control circuits for the vehicle; therefore, illumination of the pointer 60 by means of the light source 54 indicates that the vehicle is in a "power on" mode and ready for operation. By using a relatively dark material for the dial face the pointer 60 is essentially invisible until the truck control circuits are energized, thereby enhancing the effectiveness of the system as a "power on" indicator.

To provide battery condition indication a normally closed battery discharge indicator 96 is wired, in parallel with a flasher unit 98, in the lamp circuit. In the illustrated embodiment the battery discharge indicator is a commercially available unit manufactured by the Hertner Division of the General Battery Corporation. It is essentially a voltage sensitive device compensated for temperature and other variables. When a low battery condition exists, the discharge indicator opens inserting the flasher in series with the lamp.

OPERATION

In a typical order picking operation the order picker vehicle is driven, with the operator's platform in the solid line position of FIG. 1, into an aisle of storage bins by an operator standing on floor plate 38 and facing to the right on the vehicle as shown in FIG. 1. Once in the aisle the vehicle is maneuvered so that a pallet or other load receiving means supported on the forks 48 is generally aligned with a bin from which the operator removes goods to fill a particular order. At this point the operator's platform can be as much as twenty feet off the ground.

When picking from the first bin is completed the order may require that the vehicle 10 be moved a considerable distance along the aisle. To complete such a move efficiently all controls are operable in any position of the operator's platform so that the vehicle can be moved along the aisle with the platform at its highest elevation. When the operator is ready to move the vehicle he need only glance downward at the dial face 88 in the top of the power unit compartment cover 90 to obtain an immediate indication of essential vehicle conditions. If the pointer 60 is illuminated and the light is constant he knows that all vehicle control circuits are energized and that the battery is sufficiently charged to continue picking operations. If the pointer 60 is flashing the operator knows that the battery is not in condition to permit continuous picking operations. Since the illuminated pointer 60 is connected directly to the drive/steer unit 26 the angular position of the pointer indicates the exact angular position of the drive/steer wheel 22 so that the vehicle can be started smoothly in exactly the direction desired by the operator.

We claim:

1. In a vehicle having a frame, at least one steerable ground engaging wheel for guiding movement of said vehicle, and an operator's station positionable remotely above said steerable wheel: support means operatively mounting said steerable wheel to said frame for steering rotation about a substantially vertical axis and for rotation about a substantially horizontal axis, a light transmitting member operatively connected to said steerable wheel for rotation about said vertical axis and having a light receiving surface and a light emitting surface, and a light source including an electrical circuit for energization thereof, said electrical circuit having an electrical flasher unit connected electrically in series with said light source and connected electrically in parallel with a normally closed battery discharge indicator, opening of said discharge indicator due to a low battery voltage condition putting said flasher in series with said light source to cause said light source to flash indicating a low battery voltage condition, said light source being operatively mounted on said frame in position to illuminate said light receiving surface, and said light emitting surface being oriented in a fixed predetermined position relative to said horizontal axis capable of indicating the orientation of said steerable wheel to an operator at said operator's station positioned remotely from said steerable wheel.

2. Apparatus as claimed in claim 1, including a housing operatively attached to said frame and receiving said light transmitting member, and means formed in said housing to render said light emitting surface visible from a position remote from said vehicle.

3. Apparatus as claimed in claim 2, in which said means formed in said housing comprises a transparent member secured within an opening formed in said housing.

4. Apparatus as claimed in claim 3 in which said transparent member comprises a dial face secured within an opening in a horizontal surface of said housing, and said light emitting surface is rectangular to define an elongated pointer with its longest dimension aligned with the plane of rotation of said steerable wheel.

5. Apparatus as claimed in claim 4 in which said dial face is colored to render said pointer substantially invisible when said light transmitting member is not illuminated by said light source.

6. Apparatus as claimed in claim 1, including electric power and control circuits to power said vehicle and a master switch to control said power and control circuits, said light source being connected in an electrical circuit energized by closing said master switch controlling said power and control circuits of said vehicle, energization of said light source providing indication that said vehicle is in a "power on" condition.

7. In a vehicle having a frame, a vertical mast attached to said frame, an operator platform vertically movable along said mast, a drive/steer unit mounted to said frame for rotation about a vertical steering axis, said drive/steer unit being received in a housing and comprising a drive motor, and at least one ground engaging drive/steer wheel operatively connected to the output of said motor for rotating said wheel about a substantially horizontal drive axis: a light source attached to said motor for rotation therewith about said vertical steering axis, said light source also including an electrical circuit for energization thereof; a light transmitting member having a light receiving surface illuminated by said light source and a light emitting surface attached to said light source, said light source and light transmitting member being disposed within said housing with said light emitting surface adjacent a portion of said housing and having a fixed predetermined alignment with said steering and driving axes, and said electrical circuit for said light source having an electrical flasher unit connected electrically in series with said light source and connected electrically in parallel with a normally closed battery discharge indicator, opening of said discharge indicator due to a low battery voltage condition putting said flasher in series with said light source to cause said light source to flash indicating a low battery voltage condition; and means formed in said housing for rendering said light emitting surface visible to an operator located remotely on said platform.

8. Apparatus as claimed in claim 7, including electric power and control circuits to power said vehicle and a master switch to control said power and control circuits, said light source being connected in an electrical circuit energized by closing said master switch controlling said power and control circuits of said vehicle, energization of said light source providing indication that said vehicle is in a "power on" condition.

* * * * *